Figure 1:
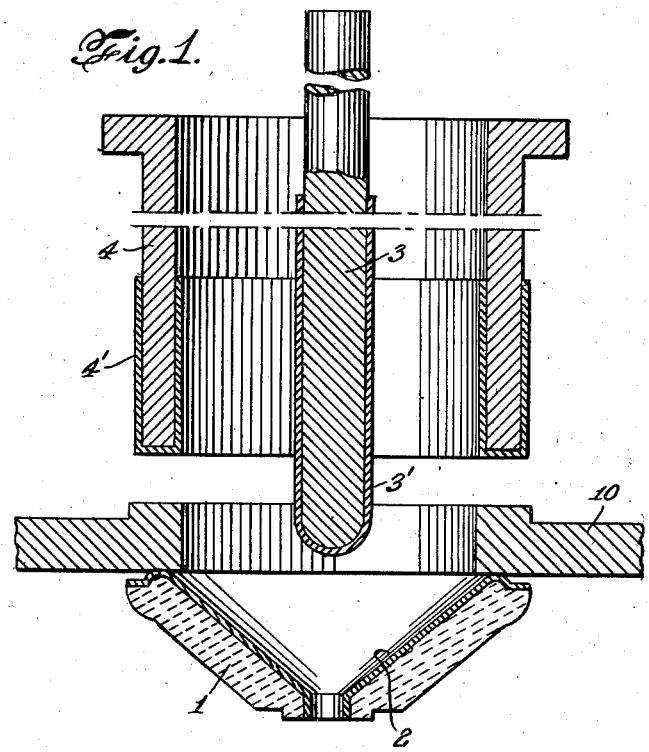

Aug. 27, 1957     H. KLAUSMANN     2,803,925
GLASS FORMING DIE
Filed Oct. 25, 1951

INVENTOR.
HARRY KLAUSMANN
BY
ATTORNEY.

United States Patent Office 2,803,925
Patented Aug. 27, 1957

2,803,925

GLASS FORMING DIE

Harry Klausmann, Maplewood, N. J., assignor to Baker & Co., Inc., Newark, N. J., a corporation of New Jersey Application October 25, 1951, Serial No. 253,036

4 Claims. (Cl. 49—55)

This invention relates to the manufacture of glass and is concerned more particularly with the provision of glass handling and forming apparatus and parts thereof made of metal.

This application is a continuation-in-part of my prior application Serial No. 6,965, filed February 7, 1948, now abandoned.

In the manufacture of glass and glass products molten flowing glass is caused to pass through apparatus such as dies for the extrusion thereof into various shapes. Of particular interest is the manufacture of articles from the borosilicate glasses or other glasses having high silica content, e. g. about 70% or more, and requiring forming temperatures of 2400° F. to 2800° F. or higher. At these high temperatures the known apparatuses are subject to deformation after continued usage due to chemical attack or to various mechanical phenomena. The material out of which the dies, bushings, plungers, stirrers, or other glass manufacturing parts are made or out of which linings for tanks, forehearths, etc. are made, must combine certain essential properties. The material must be ductile and mechanically workable to a degree sufficient to allow for the formation of the intricate and delicate forms required for the manufacture of glass, e. g. the finely perforated die for the extrusion of clean glass fibers. The material must be highly corrosion resistant to the chemical and mechanical attack of the flowing glass in order to provide a long operating life for the expensive apparatus and to insure a uniformity of structure and dimension of the glass product. The material must be able to withstand high operating temperatures without volatilizing in order to insure a high degree of fluidity of the flowing glass and greater freedom from strains within the glass products. In this connection, in order to insure the high fluidity and uniformity of product, it is necessary that the metal surfaces of the manufacturing equipment, and especially the orifices of the die, be slightly wetted by the flowing molten glass to reduce frictional resistance to uniform flow of the glass.

It is one object of this invention to provide glass manufacturing equipment such as dies or liners for exit orifices for the extrusion of a molten glass which is highly resistant to the chemical and physical attack of such glass. It is a further object of this invention to provide such equipment as needles, plungers, stirrers, liners for glass tanks, pots, forehearths, etc. for the manufacture of glass which are capable of withstanding very high operating temperatures. A still further object of the invention is to provide metal glass manufacturing apparatus which is both corrosion resistant and wettable to a slight degree sufficient to allow molten glass to flow evenly therethrough at high temperatures in order to insure a uniformity of glass product.

Figure 2:
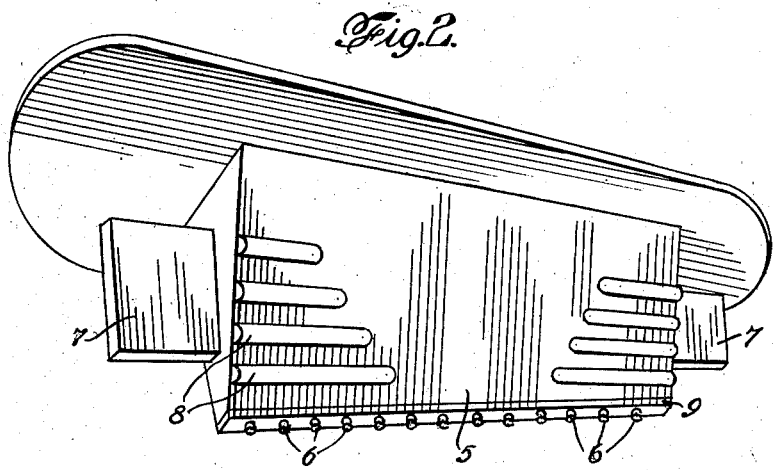

Further objects and advantages will become apparent from a consideration of the following disclosure taken in connection with the drawings, in which:

Figure 1 represents a cross-sectional view taken through a feeder of a glass forming device, and Figure 2 represents a perspective view of a glass extrusion die or bushing.

Various apparatus for the manufacture of glass were made of ceramics at one time. However due to the early deterioration of such ceramics various metals have been used such as platinum or alloys thereof to withstand the deleterious effects upon prolonged use at high operating temperatures.

Of the various platinum alloys used for this purpose previously the Pt-Rh binary alloy has appeared most advantageous. However, in all prior art teachings known it has always been proposed that a major amount of Pt (at least 50%) be present in the alloy. This would appear proper from the past knowledge of the mechanical properties and workability of such alloys. In the annealed condition, the hardness of Pt is about 40 BHN and this increased to about 90 BHN for the 50% Rh alloy and then remains almost constant to 100% Rh. With the hard worked alloys the Brinell hardness increases from about 100 BHN for Pt to about 320 BHN for 50% Rh alloy. From a consideration of this knowledge of hardness values and other mechanical properties concerning the Pt-Rh alloys those skilled in the art come to the conclusion that alloys containing less than about 20% Rh may be worked hot or cold while those containing between 20% and 40% Rh must be hot worked prior to cold working; and further that the practical limit of workability was the 40% Rh-60% Pt alloy.

I have found, however, contrary to the results to be expected from the prior knowledge in the art, that where an alloy is used for the fabrication of glass handling parts having a major amount of rhodium alloyed with some of the group VIII base metals certain desirable qualities are provided.

The critical rhodium content has been found to be between about 85% to about 99.5% in the case of a binary alloy and to about 97.5% in the case of a ternary alloy. As alloying elements in a binary alloy the metals taken from the group platinum, palladium, nickel or cobalt found in group VIII of the periodic table have been determined to be satisfactory. Only the above named elements of the group VIII metals have been found to be usable as alloying agents with Rh for the purpose of the invention, since of the other metals of group VIII, ruthenium and iridium are undesirable for their hardening qualities, while osmium is too volatile for use at the contemplated high temperatures and iron would detract from the desirable corrosion resistance property required in glass manufacturing apparatus.

I have further determined that a ternary alloy of Rh-Ni-alloyed with the group Pt, Pd or Co is also satisfactory since the basic and novel characteristics provided by an alloy containing the abovementioned critical amount of Rh in a binary alloy are not materially affected by the addition of Ni to form a ternary alloy, and where extremely thin liners are used for forehearths, etc. any possibility of cracking found to be present in some articles using the binary alloy is avoided.

In the binary alloy of the invention the critical composition ranges are 85–99.5% Rh with 0.5–15% of platinum, palladium, nickel or cobalt. Preferably the Rh content is from 90–97.5% with 2.5–10% of the remaining metal. A particularly useful alloy for my purposes is one of Rh-Pt selected from the ranges of 85–99.5% Rh and 0.5–15% Pt.

In the ternary alloy of the invention the composition ranges are about 85% to 97.5% Rh with 0.5–10% of platinum, palladium or cobalt and 2–5% of nickel. A particularly useful ternary alloy for glass manufacturing purposes is the Rh-Pt-Ni alloy.

Rhodium is a very hard and refractory metal which is extremely difficult to work. In its pure state, rhodium would be unsuitable for glass handling parts, being a highly refractory metal difficult to work into some of the intricate and necessarily thin parts of the glass handling apparatus (e. g. dies). The alloying elements mentioned above, therefore, make possible the use of rhodium, as such, in the manufacture of glass handling equipment in that they impart a degree of workability to the alloy sufficient to allow for the formation thereof into the intricate shapes used in dies, etc.

The workability of the alloys of the invention and their adaptability for manufacture into the required shapes and forms is high, as indicated below.

EXAMPLE I

A binary alloy of 95% Rh and 5% Pt was cold rolled from 0.125" to 0.022" without fracture after an initial anneal at 750° C. (equivalent to a reduction of 82.5%). Rhodium by itself, under the same treatment, can be cold rolled from 0.125" to only 0.051", which is equivalent to a reduction of only 59%.

EXAMPLE II

A ternary alloy of 90% Rh, 8% Pt and 2% Ni annealed at 750° C. was taken through the rolls at room temperature from 0.125" to 0.017" (a reduction of over 86%) before the alloy became brittle. The ternary alloy was thus workable to a greater degree than either pure rhodium or the Rh-Pt alloy.

The enhanced ductility of the rhodium alloys of the invention relative to the low ductility of rhodium itself, is quite surprising and unexpected in view of the prior knowledge in the art since normally ductility is adversely affected by the addition of other elements, and this is true in the binary as well as the ternary system.

In this respect I have discovered that with respect to the cold rolling operation used in fabricating glass handling and forming apparatus the ductility of Rh is increased by alloying it with Pt, Ni, Pd or Co where the Rh content is about 85% to about 99.5% in the case of a binary alloy and to about 97.5% in the case of a ternary alloy. If present in the alloy in an amount less than 85%, the Rh is not sufficient to give the alloy the characteristic hardness and resistance to erosion of pure Rh.

A die for the extrusion of molton glass must be of a material that is readily workable at the lower temperatures required during fabrication and yet must have high strength at high temperatures to withstand the mechanical impact and corrosive action of masses of molten glass for prolonged periods. The main problem therefore which I have now resolved was to condition pure rhodium to so alter its hardness or resistance to working without adversely affecting its properties of hardness and resistance to erosion at high temperatures while avoiding making the alloy so ductile that a die made therefrom will undergo changes in dimensions under prolonged use at high temperatures. I have found that during the manufacture of glass where the manufacturing apparatus includes alloys containing below about 80% Rh the ductility is too great for safe use at the high temperatures contemplated herein and that since the parts must be very thin (e. g. 0.014" for liners) and not subject to deformation at high temperatures at least 85% Rh content is required; and further that at least 0.5% of the above mentioned alloying constituents are required to impart ductility to the Rh. Therefore, the critical amount of the alloying material is 0.5–15% for imparting desired ductility to the rhodium.

The attainment of better ductility in the alloys disclosed herein is believed to be due to a change in the structure of the metal composition such as the development during the working of the alloy of a fiber structure before the normally unworkable hardness is reached. This is to say that the grains are elongated along one crystal axis in the longitudinal direction of the wire or other part being formed.

The particular suitability of these rhodium alloys for the fabrication of glass handling elements is due to the high melting point of the Rh, which remains substantially high notwithstanding the presence of the other alloying components. The extreme elevated temperatures (in excess of 2800° F.) to which metallic glass handling parts made of the rhodium alloys of the invention can be subjected for extended periods of time without deterioration or substantial change of dimensions, is an important factor in the case of outlet or extrusion orifices, where it is thus possible to permit the molten glass to flow through and from such orifice in a high state of fluidity and at a uniform flow rate.

I have found that in the case of Pt-Rh alloys where Pt is the major constituent, e. g. 90% Pt and 10% Rh, the Rh during extended use appears to volatilize from the alloy more than is satisfactory to the glass handling industry and the glass becomes contaminated. It appears that although the reaction between glass and platinum does not discolor the glass it is possible that there is an adverse effect on the refractive index of the glass. The solution of rhodium from the low content Pt-Rh alloys (e. g. 60% Pt, 40% Rh) may color the glass sufficiently to become objectionable where purity of color or accurate light transmission is desired. In any event the undesirable volatilization will tend to weaken the glass structure and result in the production of an inferior glass product.

In a test made for four cubical boats, one inch to the side, formed from sheet and welded at the joints with the alloy of which the boat was made, the same amount of glass of the composition given in Table I was placed into each boat and the boats were heated in air in an electric muffle furnace at 1500–1550° C. for 415 hours. The metals used were grade 3 Pt (boat A), Pt 90 Rh 10 (boat B), Pt 60 Rh 40 (boat C) and Pt 10 Rh 90 (boat D).

*Table I.—Composition of glass*

| | Percent |
|---|---|
| BaO | 27.7 |
| CaO | 5.2 |
| $K_2O$ | 4.6 |
| $Li_2O$ | 3.69 |
| $Al_2O_3$ | 1.48 |
| ZnO | 2.73 |
| TeO | 2.48 |
| ZrO | 7.98 |
| $Sb_2O$ | 0.021 |
| $SiO_2$ | Balance |

The glass in the boat A was not discolored. Glass in boat B was a light yellow brown while that in boat C was a deep yellow brown and the glass in boat D was very slightly tan tinted. Platinum was found in low concentration in the glass in boats A and B while slight traces of rhodium was found in the glass in boats B, C and D; the glass in boat C showing the greatest amount of rhodium while the glass in boat D showed the least amount of rhodium. Boats A, B and D were examined for wetting by comparing the height of the meniscus and it was determined that although boat A was wet to a greater degree all three boats were wet.

It appears, then, that when rhodium becomes the major constituent of the alloy it exercises a protective action on the platinum and the volatilization of the metal in contact with molten glass tends to decrease. Since rhodium generally tends to volatilize from its alloys more than platinum at the glass working temperatures it was quite unexpected that where Rh is the major constituent in an amount from 85–99.5% with between 0.5–15% Pt the volatilization of the Rh was negligible and the alloy could successfully be used even at temperatures in excess of those for which Pt-Rh alloys of predominant Pt content were found to volatilize.

The alloy material hereinbefore described is intended to be used in combination with various glass manufacturing parts as indicated in Figure 1.

The body of the die 1 is usually made of a ceramic or other suitable refractory material capable of withstanding high temperatures, and has a central cylindrical opening therethrough constituting an extrusion outlet for the passage of a stream of molten glass, the walls of the opening flaring upwardly and being lined with a metallic sheath or liner 2 of the alloy of the invention. A vat or forehearth 10 is arranged in proximity to the outlet and is formed of refractory material from which molten glass may be supplied through an opening to the die. Within the forehearth a needle or valve plunger 3 formed of refractory material is placed in a position to control the flow of molten material through the opening in the forehearth. Also within the forehearth a revolving stirring tube 4 is provided which is usually of metal. The plunger 3 is covered with a liner or sheathing 3' and the tube 4 is covered with a metal sheating 4' of the alloy material of the invention or at least provided with liners covering the portion of the plunger and tube respectively which is subject to contact with the molten glass and particularly that portion where the surface of the glass contacts the atmosphere. Alternatively, all the elements 1, 3, and 4 can be made entirely of the alloy material of the invention instead of being lined therewith.

In Figure 2 is shown an elongated troughlike bushing or die 5 of metal with a plurality of extrusion orifices indicated at 6, the bushing being adapted to be electrically heated as indicated by bus bars 7 with the heat being conducted by distributors 8 through the die. The entire die 5 may be made of the alloy of the invention or, alternatively, the orifice nipples 6 may alone be formed of the rhodium alloy with the remainder of the die being of a different metal, e. g. platinum or a platinum alloy. As shown in Figure 2 a further construction may be obtained by making the lower part of the die including the orifices 6 of the rhodium alloy of the invention, and the upper part or remainder of the bushing of a different metal and then welding or otherwise securing the two parts together along a line indicated at 9.

The glass fabricating parts of my invention are thus made sufficiently resistant for efficient handling of molten borosilicate glasses requiring forming temperatures of 2400° to 2800° F. to form homogeneous and strong glass products, such as glass fibers, but are also capable of use in the handling of soda lime glasses.

While I have described the alloy for use in the fabrication of glass handling parts as including rhodium in a major amount preferably with platinum I do not wish to be limited to this exact composition since the basic and novel characteristics imparted to the alloy by containing the critical amount of about 85% to about 99.5% in the case of a binary alloy and to about 97.5% in the case of a ternary alloy Rh is not materially affected by whether the binary or ternary alloy of the invention is used as long as the remaining ingredients total between 0.5-15%.

Having thus described my invention what I claim and wish to secure by Letters Patent is:

1. A fabricated glass forming die required to be in direct contact at elevated temperatures with molten glass having a silica content of at least about 70% and in such a state that the glass is capable of flowing and wetting metal, said die being formed at least in part of a ternary alloy consisting of rhodium in an amount of from 85% to 97.5%, nickel in an amount of from 2% to 5% and the balance being of a metal selected from the group consisting of platinum, palladium and cobalt.

2. A glass forming die formed at least in part of a ternary metal alloy which is in contact with molten glass in such a state that the glass is capable of flowing and wetting the metal, said ternary alloy consisting of about 85% to 97.5% rhodium, 2% to 5% nickel and 0.5% to 10% platinum by weight.

3. In glass manufacturing apparatus, a melting crucible for glass having a plurality of openings at its lower end, an extrusion die operatively arranged in alignment with said openings and provided with a plurality of extrusion orifices through which the molten glass from said crucible is exuded, heating means for said crucible and said die including heat distribution elements affixed to said die, said molten glass being capable of flowing and wetting at least those sufaces of said crucible and die with which it is required to be in direct contact at elevated temperature, said surfaces being formed of a ternary alloy consisting of rhodium in an amount of from 85 to 97.5 percent, nickel in an amount of 2 to 5 percent, and the balance being a metal selected from the group consisting of platinum, palladium and cobalt.

4. In glass manufacturing apparatus, a melting crucible for glass having a plurality of openings at its lower end, an extrusion die operatively arranged in alignment with said openings and provided with a plurality of extrusion orifices through which the molten glass from said crucible is exuded, heating means for said crucible and said die including heat distribution elements affixed to said die, said molten glass being capable of flowing and wetting at least those surfaces of said crucible and die with which it is required to be in direct contact at elevated temperature, said surfaces being formed of a ternary alloy consisting of about 85 to 97.5 percent rhodium, 2 to 5 percent nickel and 0.5 to 10 percent platinum by weight.

References Cited in the file of this patent

UNITED STATES PATENTS

| | | |
|---|---|---|
| 1,832,307 | Kingsbury | Nov. 17, 1931 |
| 2,031,083 | Weller | Feb. 18, 1936 |
| 2,066,870 | Wise et al. | Jan. 5, 1937 |
| 2,165,318 | Thomas et al. | July 11, 1939 |
| 2,460,547 | Stevens | Feb. 1, 1949 |

OTHER REFERENCES

Muller: Treatise in Annalen der Physik (5) 7, 1930, pp. 25–27 relied upon. (Copy in Scientific Library.)

Memilow et al.: Treatise in Zeitschrift fur Anorganische and Allgemeine Chemie, vol 226, 1935–36, pp. 185–189. (Copy in Scientific Library.)